United States Patent
Breton et al.

[11] Patent Number: 5,863,320
[45] Date of Patent: Jan. 26, 1999

[54] INK COMPOSITIONS

[75] Inventors: Marcel P. Breton; Kirit N. Naik, both of Mississauga, Canada

[73] Assignee: Xerox Corporation, Stamford, Conn.

[21] Appl. No.: 17,386

[22] Filed: Feb. 2, 1998

[51] Int. Cl.$^6$ .................................................. C09D 11/02
[52] U.S. Cl. ..................................... 106/31.59; 106/31.43; 106/31.57; 106/31.58; 106/31.75; 106/31.85; 106/31.86; 106/31.87; 106/31.89
[58] Field of Search ............................. 106/31.59, 31.43, 106/31.57, 31.58, 31.89, 31.75, 31.85, 31.86, 31.87

[56] References Cited

U.S. PATENT DOCUMENTS

| | | | |
|---|---|---|---|
| 3,948,668 | 4/1976 | Hayek et al. | 106/31.59 |
| 4,251,824 | 2/1981 | Hara et al. | 346/140 R |
| 4,463,359 | 7/1984 | Ayata et al. | 346/1.1 |
| 4,532,530 | 7/1985 | Hawkins | 346/140 R |
| 4,597,794 | 7/1986 | Ohta et al. | 106/20 |
| 4,601,777 | 7/1986 | Hawkins et al. | 156/326 |
| 4,627,875 | 12/1986 | Kobayashi et al. | 106/22 |
| 4,659,383 | 4/1987 | Lin et al. | 106/27 |
| 4,705,567 | 11/1987 | Hair et al. | 106/20 |
| 4,737,190 | 4/1988 | Shimada et al. | 106/22 |
| 4,840,674 | 6/1989 | Schwarz | 106/22 |
| 4,853,036 | 8/1989 | Koike et al. | 106/20 |
| 4,877,451 | 10/1989 | Winnik et al. | 106/23 |
| 5,019,166 | 5/1991 | Schwarz | 106/31.43 |
| 5,021,802 | 6/1991 | Allred | 346/1.1 |
| 5,041,162 | 8/1991 | Cooke et al. | 106/22 |
| 5,043,084 | 8/1991 | Gutierrez et al. | 252/47 |
| 5,065,167 | 11/1991 | You et al. | 346/1.1 |
| 5,124,718 | 6/1992 | Koike et al. | 346/1.1 |
| 5,156,675 | 10/1992 | Breton et al. | 106/22 |
| 5,169,437 | 12/1992 | You | 106/20 D |
| 5,207,824 | 5/1993 | Moffatt et al. | 106/22 R |
| 5,324,349 | 6/1994 | Sano et al. | 106/25 R |
| 5,348,832 | 9/1994 | Sacripante et al. | 430/109 |
| 5,364,462 | 11/1994 | Crystal et al. | 106/22 R |
| 5,401,303 | 3/1995 | Stoffel et al. | 106/31.43 |
| 5,604,076 | 2/1997 | Patel et al. | 430/137 |
| 5,648,193 | 7/1997 | Patel et al. | 430/137 |
| 5,658,704 | 8/1997 | Patel et al. | 430/137 |
| 5,679,724 | 10/1997 | Sacripante et al. | 523/161 |
| 5,684,063 | 11/1997 | Patel et al. | 523/161 |

*Primary Examiner*—Helene Klemanski
*Attorney, Agent, or Firm*—E. O. Palazzo

[57] ABSTRACT

An ink containing a liquid vehicle, colorant, and a perfluorosurfactant.

22 Claims, No Drawings

INK COMPOSITIONS

Disclosed in copending applications and patent U.S. Ser. No. 08/782,725 and U.S. Ser. No. now U.S. Pat. No. 5,762,695 the disclosures of each application being totally incorporated herein by reference in their entirety, are inks with certain surfactants. More specifically, in U.S. Pat. No. 5,762,695 there is disclosed an ink jet ink and imaging process which comprises the development of an image with an aqueous ink jet ink composition comprised of colorant, water, and a polyhydroxy alcohol surfactant present in an amount of from about 2 to about 10 weight percent.

The following applications, the disclosures of each being totally incorporated herein by reference, are being filed concurrently herewith.

U.S. Ser. No. 09/17,533 relating to an aqueous ink containing a dissipatible polymer, colorant and a zwitterionic component like betaine;

U.S. Ser. No. 09/017,459 relating to an ink containing a colorant, polymer, such as a dissipatible polymer, vehicle, and a salt of polyacrylic, a salt of polyamic acid, a salt of alginic acid, or mixtures thereof;

U.S. Ser. No. 09/017,537 relating to an ink containing a resin of a dissipatible sulfonated polyester terminated with acrylic or methacrylic acid groups;

U.S. Ser. No. 09/017,072 relating to an ink containing a mixture of two black colorants, betaine, and N,N'-bis(3-aminopropyl) ethylenediamine.

The appropriate components and processes of the above applications may be selected for the present invention in embodiments thereof.

BACKGROUND OF THE INVENTION

The present invention is generally directed to ink compositions, and more specifically, the present invention is directed to colored aqueous ink compositions particularly suitable for use in ink jet printing processes, and especially thermal ink jet processes, acoustic ink jet processes, and other similar processes, and wherein there is minimal intercolor bleed for the images developed, photo like quality, and wherein paper curl is minimized and image smearing is minimal, or avoided. In embodiments, the present invention relates to inks comprised of an ink vehicle, colorant, and a perfluorosurfactant, such as perfluorooctanoicacid ammonium salt. Images developed with the inks of the present invention in embodiments enable ink jet prints of excellent resolution, acceptable density, excellent waterfastness, minimum or very low showthrough, excellent MFLEN, and low or minimal intercolor bleed and photo like quality on appropriate substrates.

PRIOR ART

Ink jet printing can be considered a non-impact method that produces droplets of ink that are deposited on a substrate, such as paper or transparent film, in response to an electronic digital signal. Thermal or bubble jet drop-on-demand ink jet printers are useful as outputs for personal computers in the office and in the home.

In existing thermal ink jet printing, the printhead typically comprises one or more ink jet ejectors, such as disclosed in U.S. Pat. No. 4,463,359, the disclosure of which is totally incorporated herein by reference, each ejector including a channel communicating with an ink supply chamber, or manifold, at one end and having an opening at the opposite end, referred to as a nozzle. A thermal energy generator, usually a resistor, is located in each of the channels a predetermined distance from the nozzles. The resistors are individually addressed with a current pulse to momentarily vaporize the ink and form a bubble which expels an ink droplet. As the bubble grows, the ink rapidly bulges from the nozzle and is momentarily contained by the surface tension of the ink as a meniscus. As the bubble begins to collapse, the ink remaining in the channel between the nozzle and bubble starts to move toward the collapsing bubble, causing a volumetric contraction of the ink at the nozzle and resulting in the separation from the nozzle of the bulging ink as a droplet. The feed of additional ink provides the momentum and velocity for propelling the droplet towards a print sheet, such as a piece of paper. Since the droplet of ink is emitted only when the resistor is actuated, this type of thermal ink jet printing is known as "drop-on-demand" printing. Other types of ink jet printing, such as continuous-stream or acoustic, are also known.

Ink jet inks, and processes thereof are illustrated, for example, in U.S. Pat. Nos. 4,840,674; 5,021,802; 5,041,161; 4,853,036; 5,124,718; 5,065,167 and 5,043,084.

In a single-color ink jet printing apparatus, the printhead typically comprises a linear array of ejectors, and the printhead is moved relative to the surface of the print sheet, either by moving the print sheet relative to a stationary printhead, or vice-versa, or both. In some systems, a relatively small printhead moves across a print sheet numerous times in swathes, much like a typewriter. Alternatively, a printhead, which consists of an array of ejectors and extends the full width of the print sheet, may be passed once down the print sheet to give full-page images in what is known as a "full-width array" (FWA) printer. When the printhead and the print sheet are moved relative to each other, imagewise digital data is used to selectively activate the thermal energy generators in the printhead to permit the desired image to be created on the print sheet.

With the demand for higher resolution printers, the nozzles in ink jet printers are decreasing in size. Nozzle openings are typically about 50 to 80 micrometers in width or diameter for 300 spi printers. With the advent of 600 spi printers, these nozzle openings are typically about 10 to about 40 micrometers in width or diameter. These small dimensions require inks that do not plug the small openings.

Therefore, an important requirement for ink jet ink is the ability of the ink to be stable with minimal or no settling, the ability of the ink to remain in a fluid condition in a printhead opening on exposure to air, and moreover wherein when the inks are selected for ink jet printing there is minimized paper curl, or wherein paper curl can be controlled.

Another important measured property for an ink jet ink is the latency or decap time, which is the length of time over which an ink remains fluid in a printhead opening or nozzle when exposed to air and, therefore, is capable of firing a drop of ink at its intended target. Latency is the maximum idling times allowed for ink to be jetted by a printer with a speed equal to or greater than 5 m/s (equivalent to an ink traveling a distance of 0.5 millimeters in less than 100 $\mu$s) without a failure. This measurement can be accomplished with the printhead or nozzles uncovered or decapped and generally at a relative humidity of about 15 percent. The time interval is the longest length of time that the printhead, uncovered, will still fire or eject a specified drop without drop displacement or loss of density. The longer the latency time rating, the more desirable the ink. The inks of the present invention possess many of these characteristics in embodiments thereof.

Moreover, an important requirement for ink jet inks, especially for pigment, such as carbon black, based inks, is for the pigment dispersion to remain stable throughout the life of the ink jet cartridge. Dye-based ink jet inks suffer from deficiencies in waterfastness and lighffastness after being printed on various substrates. Pigments provide an image on a wide variety of substrates, having high optical density with high waterfastness and lightfastness. Therefore, pigments are a preferred alternative to dyes, provided the pigment dispersions can be made stable to prevent flocculation and/or aggregation and settling. Some cosolvents that can be selected as clogging inhibitors cause destabilization of pigment dispersions and, therefore, are not usually effective in pigmented inks.

There is thus a need for aqueous ink compositions that can be utilized in high resolution ink jet printers. Additionally, there is a need for colored, especially pigmented inks that provide high latency and also remain stable throughout the life of the ink jet cartridge. There is also a need for pigmented inks that provide high optical density in a single pass. More importantly, there is a need for ink jet inks wherein paper curl, and/or image smearing can be eliminated or minimized when such inks are selected for ink jet printing processes, and wherein the images possess minimal, or acceptable intercolor bleed, that is for example, wherein color overlap, or diffusing of one color into another is minimal, or avoided.

SUMMARY OF THE INVENTION

The present invention relates to compositions comprised of colorant, and certain additives. More specifically, the inks of the present are comprised of a major amount of a vehicle, like water, colorant, such as dye, pigment, or mixtures thereof, and additives of perfluorosurfactants. The inks in embodiments possess a latency of at least about 10 seconds in a printer having at least one nozzle of a channel width or diameter ranging for example, from about 10 to about 40 microns, and wherein intercolor bleed is minimized or eliminated.

Embodiments of the present invention include, an ink comprised of a vehicle, colorant, and a perfluorosurfactant; an ink comprised of a vehicle, colorant, and an additive of a perfluorooctanoicacid ammonium salt, a perfluorooctanesulfonic acid alkali metal, a perfluoroheptoxy poly(propyloxy)acrylate, an ethylperfluorooctanesulfamido ethyl acrylate, 2-(N-butylperfluorooctanesulfamido) ethyl acrylate, a monofluoroooctyl maleate, perfluorooctanoic acid alkali salt, a perfluoropentanoic alkali salt, or mixtures thereof; an ink wherein the alkali metal is sodium, or potassium; an ink wherein the colorant is a pigment; an ink wherein the colorant is a dye; an ink wherein the perfluorosurfactant additive is present in an amount of from about 0.01 to about 10 weight percent, and wherein the total amount of all ink components is equal to about 100 percent; an ink wherein the perfluorosurfactant additive is present in an amount of from about 0.01 to about 10 weight percent, and the colorant is a pigment; an ink wherein the perfluorosurfactant additive is present in an amount of from about 1 to about 5 weight percent, and the colorant is a pigment; an ink wherein the colorant is the pigment carbon black; an ink wherein the pigment possesses a particle size distribution wherein at least about 90 percent of said pigment particles have a diameter of about 0.1 μm with the remaining pigment particles being of a diameter of about 1.0 μm; an ink wherein the vehicle is water; an ink wherein the vehicle is a glycol, or a mixture of glycols; an ink further containing ink additives; an ink wherein said additives are surfactants of poly(ethylene glycol) monolaurate, poly(ethylene glycol) monoricinoleate, poly(ethylene glycol) lanolin alcohol ether, poly(ethylene glycol) monooleate, poly(ethylene glycol) castor oil, poly(ethylene glycol) tetramethyl decynediol, or poly(ethylene glycol) lanolin, and which surfactants are present in an amount of from about 0.01 to about 7 weight percent or parts based on the total ink components; an ink wherein there can be selected penetrants of N-methylpyrrolidinone, sulfoxides, ketones, lactones, esters, alcohols, butyl carbitol, benzyl alcohol, cyclohexylpyrrolidinone, and 1,2-hexanediol, present in an amount of from about 0.01 percent to 20 percent by weight; a high resolution printing process comprising applying in imagewise fashion to a substrate the invention ink in a printer having at least one nozzle of a channel width or diameter ranging from about 10 to about 40 microns and intercolor bleed is minimized or eliminated, and wherein the printing process is optionally accomplished with a 600 spi ink jet printer with a radiant heat assisting drying process; a printing process which comprises incorporating into an acoustic ink jet printer the invention ink with a viscosity of from about 0.7 to about 5 centipoise at a temperature of from about 25 degree Centigrade to about 50 degree Centigrade, and causing droplets of the ink to be ejected in imagewise pattern onto a substrate; a process which comprises (a) providing a acoustic ink printer having a pool of liquid ink with a free surface, and a printhead including at least one droplet ejector for radiating the free surface of said ink with focused acoustic radiation to eject individual droplets of ink therefrom on demand, said radiation being brought to focus with a finite waist diameter in a focal plane, and which ink possesses a viscosity of from about 0.7 to about 5 centipoise at a temperature of from about 25 degree Centigrade to about 50 degree Centigrade, and (b) causing droplets of said ink to be ejected onto a recording sheet in an imagewise pattern at a temperature of from about 20 degree Centigrade to about 50 degree Centigrade; an ink wherein the mixtures are comprised of from about two to four additives each present in amount ranging from about 1 percent to about 99 weight percent, and wherein the total thereof is about 100 percent; an ink wherein the vehicle is a glycol, the colorant is a pigment, and which pigment is present in an amount of about 3 to about 15 weight percent; an ink wherein the perfluorosurfactant is a perfluorooctanoicacid ammonium salt, a perfluorooctanesulfonic acid alkali metal, a perfluoroheptoxy poly(propyloxy)acrylate, an ethylperfluorooctanesulfamido ethyl acrylate, 2-(N-butylperfluorooctanesulfamido) ethyl acrylate, a monofluoroooctyl maleate, perfluorooctanoic acid alkali salt, a perfluoropentanoic alkali salt, or mixtures thereof; an imaging process which comprises the development of an image with an aqueous ink jet ink composition comprised of colorant, such as dye or pigment, water, and perfluorosurfactants additives as indicated herein, and wherein images with acceptable, or low intercolor bleed, photo like quality, and minimal curling and minimal smearing are obtained; and a high resolution printing process comprising applying in imagewise fashion to a substrate in a printer having at least one nozzle of a channel width or diameter ranging from about 10 to about 40 microns. Also, the inks and imaging processes of the present invention in embodiments thereof can possess numerous advantages including excellent ink waterfastness, lightfastness, low product cost, high image resolution, excellent print quality on a variety of substrates, excellent jetting capability with high drop velocity, longer latency, larger drop mass or drop volume which provides optimal optical density in a single pass, high frequency response which allows for high speed printing, excellent printhead recoverability and maintainability, excellent ink stability, minimal ink and pigment settling, a lack of printhead kogation, and more importantly, wherein the inks when selected for ink jet processes enable photo like quality, and low intercolor bleed, or substrates such as paper.

Examples of vehicles selected for the inks include water, gylocols, mixtures of glycols, a mixture of water and a miscible organic component, such as a glycol, such as ethylene glycol, propylene glycol, diethylene glycols, glycerine, dipropylene glycols, polyethylene glycols, polypropylene glycols and the like, amides, ethers, carboxylic acids, esters, alcohols, organosulfides, organosulfoxides, sulfones, dimethylsulfoxide, sulfolane, alcohol derivatives, carbitol, butyl carbitol, cellusolve, ether derivatives, amino alcohols, ketones, and other water miscible materials, and mixtures thereof. The liquid vehicle is generally present in an amount of from about 50 to about 99 and preferably about 98.9 percent by weight, based on total amount of components in the ink, and more preferably from about 55 to about 95 percent by weight, and still more preferably from about 60 to about 90 percent by weight, although the amounts may be outside these ranges in embodiments. The total of all ink components is about 100 percent, or 100 parts. Also, there can be selected other vehicles not specifically recited herein.

When mixtures of water and water miscible organic liquids are selected as the liquid vehicle, the water to organic ratio may be in any effective range, and typically is from about 100:0 to about 30:70, and preferably from about 97:3 to about 50:50, although the ratio can be outside these ranges. The nonwater component of the liquid vehicle generally serves as a humectant and possesses a boiling point higher than that of water (100° C.). The colorant, such as a pigment dispersion can be mixed with different humectants or solvents including ethyleneglycol, diethyleneglycol, propyleneglycol, dipropylene glycol, polyethyleneglycols, polypropylene glycols, glycerine, trimethylolpropane, 1,5 pentanediol, 1,6 hexanediol, diols and triols containing 2 to 10 carbons, sulfoxides, for example dimethylsulfoxide, alkylphenyl sulfoxides or sulfones like sulfolane, dialkyl sulfones, alkyl phenyl sulfones, and the like, amides, for example N, N-dialkyl amides, N, N-alkyl phenyl amides, 3-methyl-2-oxazolidinone, isosorbide dimethyl ether, N-methylpyrrolidinone, N-cyclohexylpyrrolidinone, N,N-diethyltoluamide, and the like, ethers such as alkyl ether derivatives of alcohol, etherdiols, and ether triols including butylcarbitol, alkyl polyethyleneglycols, and the like, urea, betaine, or the thio (sulfur) derivatives of the aforementioned materials, for example, thioethyleneglycol, trithioethyleneglycol, and the like. Known desired penetrants, water soluble polymers, surfactants, pH buffer, biocides, chelating agents (EDTA and the like), and optional additives can also be selected for the inks.

Examples of perfluorosurfactant additives, selected in various suitable amounts, such as from about 0.1 to about 15, and preferably from about 1 to about 5 weight percent, or parts based primarily on all the ink components, and wherein the total of all the ink components is about 100 percent, include perfluorooctanoicacid ammonium salt, perfluorooctane sulfonic acid alkali metal, especially the potassium salt thereof, perfluoroheptoxypoly(propyloxy)acrylate, n-ethylperfluorooctanesulfamido ethyl acrylate, 2-(N-butylperfluorooctanesulfamido) ethyl acrylate, monoperfluoro-octyl maleate, perfluorooctanoic acid sodium salt, perfluoropentanoic potassium salt, perfluoroalkylethyl phosphates, perfluoroheptoxypoly(propyloxy) methacrylate, 3-sulfopropyl acrylate, 2-(N-butylperfluorooctanesulfamido) ethyl acrylate salt, and the like, mixtures thereof such as mixtures of sodium heptafluorobutyrate, and the like. These additives enable a number of advantages, such as providing photo like quality images, and images with minimal, acceptable, or low intercolor bleed.

Examples of optional second surfactants that may be selected include the polyhydroxy alcohol surfactants, such as PEG 1540 monolaurate, PEG 1000 monoricinoleate, PEG 75 lanolin alcohol ether, PEG 6000 monooleate, PEG 200 castor oil (also available under the name MAPEG CO-200, PPG/Specialty Chem.), and more specifically, Surfynol 485, a PEG-30 tetramethyl decynediol available from Air Products and Chem., and Solan E, a polyethylene glycol (75) lanolin available from Croda, Parsippany, and which surfactants are present in amounts of from about 0.01 to about 7 weight percent or parts based on the total ink components. The PEG 1540 monolaurate has a HLB value of about 17; the PEG 1000 monoricinoleate, a value of 17.5; the PEG 75 lanolin alcohol ether, a value of about 16; the PEG 6000 monooleate, a value of 19; the PEG 200 castor oil, a value of 18.1; the Surfynol 485, a value of 17; and the Solan E, a value of 15. Other similar commercial surfactants may also be suitable, such as, for example, Atlas G-1288 (ICI Surf. Belgium), a PEG triglyceride with an HLB value of 16.0; Atlas G-1295 (ICI Surf. Belgium), a PEG triglyceride with an HLB value of 17.5; Atlas G-1649 (ICI Am.), a PEG alkyl aryl ether with an HLB value of 16.0; Atlas G-2151 (ICI Am.), a PEG-30 stearate with an HLB value of 16.0; Atlas G-2162 (ICI Am.), a PEG-25 propylene glycol stearate with an HLB value of 16.0; Atlas G-3780A (ICI Am.), a PEG-20 tallow amine with an HLB value of 15.5; Renex 720 (ICI Am.), a PEG-20 syn. primary C13–15 alcohol with an HLB value of 16.2; Mapeg 1000 MS (PPG/Specialty Chem.), a PEG-20 stearate with HLB value of 15.7; Nissan Nonion DS-60HN (Nippon Oils & Fats), a PEG distearate of HLB value of 19.0; Nissan Nonion E-230, a PEG oleyl ether with an HLB value of 16.6; Nissan Nonion HS-220 (Nippon Oils & Fats), a PEG octylphenyl ether with an HLB value of 16.2; Nissan Nonion HS-240 (Nippon Oils & Fats), a PEG-40 octylphenyl ether with an HLB value of 17.9; or Nissan Nonion HS-270 (Nippon Oils & Fats), a PEG-70 octylphenyl ether with an HLB value of 18.7.

The colorant for the ink compositions of the present invention includes a dye, pigment, mixtures of dye and pigment, mixture of dyes, a mixture of one or more pigments, and the like. The colorant can be black, cyan, magenta, yellow, red, blue, green, orange, brown, mixtures thereof, and the like, and is preferably carbon black, such as Levanyl carbon black obtained from Bayer. Examples of suitable black pigments include various carbon blacks such as channel black, furnace black, lamp black, and the like. Colored pigments, or dyes include red, green, blue, brown, magenta, cyan, yellow, and mixtures thereof. Illustrative examples of magenta pigments include 2,9-dimethyl-substituted quinacridone and anthraquinone, identified in the Color Index as CI 60710, CI Solvent Red 19, and the like. Illustrative examples of suitable cyan pigments include copper tetra-4-(octadecyl sulfonamido) phthalocyanine, X-copper phthalocyanine pigment, listed in the Color Index as CI 74160, CI Pigment Blue, and Anthradanthrene Blue, identified in the Color Index as CI 69810, Special Blue X-2137, and the like. Illustrative examples of yellow pigments that can be selected include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy4-sulfonanilide phenylazo-4'-chloro-2,5- dimethoxy acetoacetanilide, Permanent Yellow FGL, and the like. The preferable pigment dispersions include carbon blacks, such as Hostafine Black (T and TS), Sunsperse 9303, Cabot CSC-440L and Levanyl Black A-SF. Of these, Levanyl Black A-SF and Cabot CSX-440L are the most preferred. Examples of suitable colorants, especially pigments that may be selected in embodiments are illustrated in U.S. Pat. No. 5,556,727, the disclosure of which is totally incorporated herein by reference.

Preferably, the colorant, especially pigment particle size is small to enable a stable colloidal suspension of the particles in the liquid vehicle and to prevent clogging of the ink channels when the ink is used in a thermal ink jet printer. Preferred colorant particle average diameters are generally from about 0.001 to about 2 microns, and more preferably from about 0.01 to about 1 micron in volume average diameter, although the particle size can be outside these ranges. A more preferred pigment particle size includes particles having at least 70 percent of the particles being below 0.1 micron with no particles being greater than 1.0 micron (measured on a Hodaka CAPA 700 Particle Size Analyzer). More preferably, the pigment particle size includes particles having at least 90 percent of the particles being below 0.1 micron with no particles being greater than about 1.0 micron.

Examples of suitable dyes include reactive dyes, direct dyes, anionic dyes, acid dyes, food dyes, and the like. Specific examples of suitable dyes include the ProJet dyes available from Zeneca (ICI) such as ProJet Yellow 1G, ProJet Yellow OAM, and ProJet Fast Yellow 2, ProJet Cyan 1, ProJet Fast Cyan 2, ProJet Magenta 3B-OA, ProJet Magenta 1T, ProJet Magenta 1, ProJet Fast Magenta 2, ProJet Fast Black 2. Other dyes are also suitable for the embodiments of this invention: Basacid Black X-34, available from BASF, Carta Black 2GT, available from Sandoz Inc., Duasyn Acid Blue AE-SF, available from Hoechst, Duasyn Direct Turquoise Blue FRL-SF available from Hoechst, Duasyn Yellow R-GL, available from Hoechst, Bayscript Yellow GGN, available from Bayer, Pontamine Brilliant Flavine 6G-N, available from Bayer, Bayscript Magenta WDP, available from Bayer, Duasyn Acid Rhodamine B-SF, available from Hoechst, Bayscript Yellow BR, available from Bayer, Bayscript Cyan BA Liquid, available from Bayer, Special Black HF Liquid, available from Bayer, Special Yellow CA51089FW, available from Bayer, Acid Yellow 17, available from Tricon.

The colorant, such as pigment is present in the ink composition in various effective amounts and generally from about 1 to about 20 percent by weight, preferably from about 3 to about 10 percent by weight, more preferably from about 4 to about 9 percent by weight, and most preferably from about 4 to about 8 percent, although the amount can be outside of these ranges.

Polymeric additives can also be added to the inks for example, to enhance the viscosity of the ink, include water soluble polymers such as Gum Arabic, polyacrylate salts, polymethacrylate salts, polyvinyl alcohols, hydroxy propylcellulose, hydroxyethylcellulose, polyvinylpyrrolidinone, polyvinylether, starch, polysaccharides, polyethyleneimines derivatized with polyethylene oxide and polypropylene oxide, such as the DISCOLE® series available from DKS International, Tokyo, Japan, the JEFFAMINE® series available from Texaco, Bellaire, Tex., and the like. The polymeric additives may be present in the ink of the present invention in amounts of from 0 to about 10 percent by weight, preferably from about 0.001 to about 8 percent by weight, and more preferably from about 0.01 to about 5 percent by weight, although the amount can be outside these ranges. A preferred polymeric additive is described in copending application U.S. Ser. No. 536,236 the disclosure of which are totally incorporated herein by reference, which additives are especially useful as pigment like carbon black stabilizers. The self-emulsifying sulfolated polyesters disclosed in U.S. Ser. No. 536,236 can be selected as additives in various appropriate amounts and preferably in amounts of from about 0.1 weight percent to about 12 weight percent and more preferably from about 1 weight percent to about 8 weight percent. The preferred polyesters have a glass transition temperature ranging from about 0° to about 80° C. and preferably between about 20° C. and about 65° C. One selected polyester is a sulfonated polyester with about 7.5 percent sulfonation, weight average molecular weight of about 2,080, Mn of about 1,043, Tg of about 54.9° C., and softening point of about 135° C.

Examples of specific optional ink additives that may be selected include biocides, such as DOWICIL® 150, 200, and 75, benzoate salts, sorbate salts, and the like, present in an amount of from 0 to about 10 percent by weight, preferably from about 0.001 to about 8 percent by weight, and more preferably from about 0.01 to about 4.0 percent by weight, although the amount can be outside these ranges; penetration control additives, such as N-methylpyrrolidinone, sulfoxides, ketones, lactones, esters, alcohols, butyl carbitol, benzyl alcohol, cyclohexylpyrrolidinone, 1,2-hexanediol, and the like, present in an amount of from 0 to about 50 percent by weight, and preferably from about 1 to about 30 percent by weight, although the amount can be outside these ranges; pH controlling agents, such as acids or bases, phosphate salts, carboxylates salts, sulfite salts, amine salts, and the like, present in an amount of from 0 to about 1 percent by weight, preferably from about 0.001 to about 1 percent by weight, and more preferably from about 0.01 to about 1 percent by weight, although the amount can be outside these ranges; and penetrants, as illustrated herein, such as butyl carbitol, and cyclohexylpyrrolidinone in amounts for example of from about 0.1 to about 20 percent by weight and preferably from about 0.5 to about 10 percent by weight, and the like Examples of suitable ink additives include those illustrated in U.S. Pat. No. 5,223,026 and U.S. Pat. No. 5,207,825, the disclosures of each patent being totally incorporated herein by reference.

The inks can be prepared by simply mixing the ink components and optional additives when selected. The mixing can be accomplished by various methods including homogenizing, sonification, microfluidization, mechanical mixing, magnetic stirring, high speed jetting, and the like. The sonification process is preferred since such a process provides a homogeneous dispersion by evenly distributing the dispersant throughout the colorant, especially pigment dispersion.

The dispersed colorant, especially dispersed pigment with perfluorosurfactant additive can be selected as the ink, and wherein the thoroughly mixed pigment ink mixture is first centrifuged by a batch process or a continuous process utilizing commercially available equipment, such as bottle centrifuges, preparative ultracentrifuges, analytical ultracentrifuges, zonal centrifuges, tubular centrifuges, disk centrifuges, continuous conveyor-discharge centrifuges, basket centrifuges, liquid cyclones, and the like to remove large pigment particles from the ink. Centrifuging should be conducted for a time sufficient to remove large size particles and at a rate of about 4,000 to 8,000 rpm. The continuous centrifuge process is very useful in the commercial production of large quantities of pigment ink for the separation of large pigment particles from the ink. The ink is also preferably subjected to a filtration process which utilizes various commercial filtration media including cartridges constructed from nylon, polyester, TEFLON®, polysulfone, and other suitable polymeric materials; membranes; porous ceramic media; cloth; and the like. The filter should be of a size to remove particles greater than 3 μm in size diameter, preferably greater than 1.2 μm in size, and most preferably greater than 1 μm, for example from about 1 to about 3 microns in size. Any suitable filtration method, such as continuous and/or batch filtration methods, may be used. Continuous filtration methods are preferred for large scale production of colorant inks. Inks which have been centrifuged and filtered so as to preferably remove particles greater than 1 μm in size from the ink are suitable for use as ink jet inks because of their ability to not clog the ink jet, and their long latency and jetting stability.

The surface tension of the colorant, such as pigment dispersions are, for example, greater than about 30 dynes/cm$^2$, preferably greater than about 45 dynes/cm$^2$, and more preferably greater than about 60, such as from about 70 to about 100 dynes/cm$^2$. The ink compositions posses surface tensions of for example, greater than about 25 dynes/cm$^2$, preferably greater than about 45 dynes/cm$^2$ and more preferably greater than about 50, such as from about 50 to about 100, dynes/cm$^2$. The viscosity of the ink composition is of for example, less than about 10.0 cps, preferably less than about 8.0 cps, and more preferably less than about 5.0 cps, such as from about 1 to about 5 cps. The surface tension can be measured with a Kruss Model K10 tensiometer, and the viscosity can be determined at about 25° C.

The inks of the present invention possess excellent latency. Generally, the inks possess a functional latency of at least 10 seconds, more generally on the order of 20 seconds to greater than 1,000 seconds, with a minimum latency of at least about 30 seconds being preferred.

The ink may be applied to a suitable substrate in imagewise fashion. Application of the ink to the substrate can be by any suitable process compatible with aqueous-based inks, such as flexographic printing, pen plotters, continuous stream ink jet printing, drop-on-demand ink jet printing (including both piezoelectric and thermal ink jet processes), or the like. The substrate employed can be any substrate compatible with aqueous-based inks, including plain paper, such as Xerox® series 10 paper, Xerox® 4024 paper, or the like, coated papers, such as those available from Jujo, transparency materials suitable for aqueous inks or ink jet printing processes, or the like.

In the Examples that follow the carbon black selected for the inks was Levanyl carbon black obtained from Bayer.

STEP 1

Preparation of Self-emulsifying Sulfonated Polyester

The self-emulsifying sulfonated polyester copoly(1,2-propylenedimethyl)terephthalate-copoly(sodium sulfoisophthalate dicarboxylate) was prepared by a polycondensation process. The polycondensation reaction was accomplished in a modified 5 gallon 4555 Parr Pressure reactor equipped with 1/2 Hp (1750 rpm) variable speed stirrer motor, a Watlow Series 945 temperature/stirrer controller and a 3 zone ceramic heater unit. A 24 inch Liebeg glass condenser with a 1 liter round bottom catch flask was fitted to a 24.29 steel joint welded to the top plate of the reactor. Glass transitions (Tg) of approximately 10 to 30 milligrams of the polymer were measured on an E.I. DuPont DSC 10 Differential Scanning Calorimeter and the DSC thermograms processed using software supplied with DuPont Thermal Analyst 2200 computer. Softening points (Ts) were measured using a FP83 Dropping Point heater and processed using a Mettler PP80 processor.

The reactor was charged with 3.492 kilos (17.64 moles, Hoechst Celanese) of dimethylterephthalate and 0.9405 kilos of dimethyl 5-sulfoisophthalate (3.175 moles, DuPont), 2.901 kilos of propylene glycol (38.12 moles, APCO Industries Company Ltd.), 0.449 kilos of diethylene glycol (4.23 moles, APCO Industries Company Ltd.) and 7.2 grams of the transesterification catalyst, Fascat (Elf Atochem). The initial set temperature of the reactor was 90° C., and the temperature was increased slowly to 150° C. over a period of 3 hours. Slow stirring (speed 0.43) of the melt was initiated and the reaction temperature increased to 200° C. over a 4 hour period to allow for transesterification. Methanol distillate was first observed at 157° C., and continued until approximately 1,500 milliliters were recovered. An additional 560 milliliters of excess glycols were removed and trapped in a dry ice trap by increasing the temperature slowly to 210° C. and submitting the mixture to a vacuum of about 260 millimeters/Hg. An Edwards Vacuum pump was then attached and the vacuum slowly decreased to 1 millimeter/Hg to remove an additional 337 milliliters of glycols. Vacuum and heat were continued for an additional two hours at the same temperature and a final hour at 215° C. The reactor was then discharged. The self-emulsifying polymer produced was found to have a glass transition temperature of 54.9° C. and a softening point of 135.1° C. Its sulfonation level was 7.5 percent and its $M_w$ was 2,080. This polymer was used to prepare stable dispersions of Levanyl (available from Bayer) carbon black.

STEP 2

Preparation of Aqueous Solution from Polymer Obtained in 1

An aqueous polyester solution was prepared by slowly adding 10.15 grams of the sulfonated polyester polymer obtained in 1 above to 118.6 grams of deionized water retained at a temperature of about 80° C. The resulting polymer solution was heated and stirred with a stirring bar at this temperature until the polymer was completely dissolved and the solution appears clear, and for an additional 10 minutes thereafter. The resulting solution was then permitted to cool down to room temperature, about 25° C., while continuing with the agitation.

STEP 3

Preparation of Carbon Black Dispersion from Solution Obtained in 2

A carbon black dispersion was prepared by adding 91.23 grams of Levanyl A-SF dispersion available from Bayer (carbon black content of 31.8 percent) to the solution obtained from 2 above. Additional deionized water was added to the mixture to obtain 210 grams of a Levanyl/polyester dispersion. The dispersion was then mixed further for a period of 15 minutes.

STEP 4

Microfluidization of Dispersion Solutions Prepared in Step 3

A modified microfluidizer, model M110F, specially modified with compressed air cooling through an isolator and cooling bath externally mounted around the intensifier pump, was used to further process the carbon black dispersion obtained in 3 above. The dispersion obtained in 3 above was processed at 11,500 psi. The processing temperature, 80° C., was reached within 5 to 10 minutes with the assistance of an electrical heater attached to the inlet vessel of the microfluidizer. The microfluidizer was operated for an additional 15 minutes while maintaining the temperature of the intensifier cooling bath at a temperature of about minus 10° C. This was achieved by circulating compressed air (30 psi) through the isolator cooling line and by maintaining the externally mounted cooling bath filled with dry ice and isopropyl alcohol. The microfluidizer was then shut off and the resulting carbon black dispersion was discharged from the microfluidizer vessel.

STEP 5

Preparation of Carbon Black Inks

A carbon black ink was prepared in an amount of 30 grams by adding the required proportions of the microfluidized dispersion obtained in 4 above, for example 16.04 grams for a 7 percent by weight carbon black ink, to water, 3.313 grams. After five minutes of agitation, 9.00 grams of sulfolane were added to the mixture. Subsequent to another five minutes of agitation, 0.147 gram of cyclohexylpyrrolidinone was added and finally, five minutes later, 1.5 gram of betaine was added. The resulting ink which was comprised of 7.39 weight percent of carbon black, 2.58 percent of the dissipatable polymer of Step 1, 30 weight percent of sulfolane 0.49 weight percent of cyclohexylpyrrolidinone, 5 weight percent of betaine and 54.54 weight percent of water was stirred for about 3 hours at room temperature, left standing for a period of 18 hours, and then filtered through a one micron glass fiber filter. The resulting ink was used as a standard black (constant) and printed against the colored inks prepared as per Examples I to VII below using an HP 160° C.

EXAMPLE I–VII

A series of seven yellow inks (100 g each total) were prepared by adding to water, while stirring, ProJet Yellow 1G, Ethylene glycol, Dowicil 200 and a perfluorosurfactant, A to F in Table 1: A, B, C, D, E, F are respectively perfluorooctanoic acid ammonium salt (A), available from PCR Inc., perfluoroheptoxy poly(propyloxy)acrylate (B), available from Dajac Laboratories Inc., N-ethylperfluorooctanesulfamido ethyl acrylate (C), available from Dajac Laboratories Inc., Lodyne P201, an anionic bitail fluorothio alkyl (D), available from Ciba Gigey, Lodyne P502 (E), an anionic bitail fluoroallylether alkyl, available from Ciba Gigey, and FC430 (F), a mixture of fluoroaliphatic polymeric esters, available from 3M. The amounts of each of the components in the ink are shown in Table 1. The inks were pressure-filtered through a 0.45-μm filter to remove coarse particles. They were then printed on Xerox Image Series LX and Courtland 4024 DP paper using a modified HP 1600C printer. The modifications allowed the turning of the drying mechanism "bn" or "bff" and thus there could be obtained intercolor bleed data under two printing conditions. The intercolor bleed data for the inks of Examples I to VII, data obtained against the carbon black ink obtained in 5 above, are provided in Table 2 together with the ink surface tension, which surface tension was measure at 25 degrees centigrade on a Kruss surface tensiometer with a Wilhemy plate ink.

TABLE 1

Examples I–VII

| EX. # | ProJet Yellow 1G, g (Zeneca, 7.86% Solution) | Ethylene Glycol, g (Aldrich) | Dowicil 200, g (Dow) | Water, g | Perfluoro surfactant, Type, 1 g |
|---|---|---|---|---|---|
| 1 | 16.5 | 18 | 0.05 | 65.45 | None |
| 2 | 16.5 | 18 | 0.05 | 64.45 | A |
| 3 | 16.5 | 18 | 0.05 | 64.45 | B |
| 4 | 16.5 | 18 | 0.05 | 64.45 | C |
| 5 | 16.5 | 18 | 0.05 | 64.45 | D |
| 6 | 16.5 | 18 | 0.05 | 64.45 | E |
| 7 | 16.5 | 18 | 0.05 | 64.45 | F |

TABLE 2

| Ex. # | Surface Tension N/m | Image Series LX Heaters ON | Image Series LX Heaters OFF | Courtland 4024 DP Heaters ON | Courtland 4024 DP Heaters OFF |
|---|---|---|---|---|---|
| I (control) | 46.4 | 11.0 | 87 | 28 | 35 |
| II | 25.4 | 0.5 | 91 | 7 | 127 |
| III | 29.1 | 0.5 | 91 | 3 | 92 |
| IV | 25.3 | 25.0 | 115 | 19 | 129 |
| V | 37.2 | 2.0 | 20 | 4 | 26 |
| VI | 32.6 | 4.0 | 77 | 14 | 77 |
| VII | 26.6 | 9 | 34 | 23 | 75 |

The data of Table 2 evidences the advantages of for example, using the perfluorosurfactants of the present invention for controlling intercolor bleed between two inks, particularly when a heater was used during the printing process as in the HP1600C printer. On Image Series LX paper (heaters 'ON'), the intercolor bleed was reduced from 11 microns to between 0.5 and 9 microns with the exception of Example IV. On Courtland 4024 DP paper, the intercolor bleed was reduced from 28 microns to between 3 and 23 microns. With heaters 'OFF', the effectiveness of the additives was significantly reduced. Optimal performance was achieved with the perfluorosurfactant, Lodyne P201 (Example V).

Other modifications of the present invention may occur to those skilled in the art subsequent to a review of the present application and these modifications, including equivalents thereof, are intended to be included within the scope of the present invention.

What is claimed is:

1. A printing process which comprises incorporating into an acoustic ink jet printer an ink comprised of a vehicle, a colorant, and a perfluorosurfactant, and which ink possesses a viscosity of from about 0.7 to about 5 centipoise at a temperature of from about 25 degree Centigrade to about 50 degree Centigrade, and causing droplets of the ink to be ejected in imagewise pattern onto a substrate.

2. A process in accordance with claim 1 wherein said perfluorosurfactant is a perfluorooctanoicacid ammonium salt, a perfluorooctanesulfonic acid alkali metal salt, a perfluoroheptoxypoly(propyloxy)acrylate, an ethylperfluorooctanesulfamido ethyl acrylate, 2-(N-butylperfluorooctane sulfamido) ethyl acrylate, a monofluorooctyl maleate, perfluorooctanoic acid alkali salt, a perfluoropentanoic alkali salt, or mixtures thereof.

3. A process in accordance with claim 2 wherein the alkali metal is sodium, or potassium.

4. A process in accordance with claim 2 wherein the colorant is a pigment.

5. A process in accordance with claim 2 wherein the colorant is a dye.

6. A process in accordance with claim 3 wherein the colorant is a pigment.

7. A process in accordance with claim 2 wherein said perfluorosurfactant is present in an amount of from about 0.01 to about 10 weight percent, and wherein the total amount of all ink components is equal to about 100 percent.

8. A process in accordance with claim 2 wherein said perfluorosurfactant is present in an amount of from about 0.01 to about 10 weight percent, and the colorant is a pigment.

9. A process in accordance with claim 2 wherein said perfluorosurfactant is present in an amount of from about 1 to about 5 weight percent, and the colorant is a pigment.

10. A process in accordance with claim 2 wherein said colorant is the pigment carbon black.

11. A process in accordance with claim 10 wherein said pigment possesses a particle size distribution wherein at least about 90 percent of said pigment particles have a diameter of about 0.1 $\mu$m with the remaining pigment particles being of a diameter of about 1.0 $\mu$m.

12. A process in accordance with claim 2 wherein the vehicle is water.

13. A process in accordance with claim 2 wherein the vehicle is a glycol, or a mixture of glycols.

14. A process in accordance with claim 2 further containing ink additives.

15. A process in accordance with claim 14 wherein said additives are surfactants of poly(ethylene glycol) monolaurate, poly(ethylene glycol) monoricinoleate, poly(ethylene glycol) lanolin alcohol ether, poly(ethylene glycol) monooleate, poly(ethylene glycol) castor oil, poly(ethylene glycol) tetramethyl decynediol, or poly(ethylene glycol) lanolin, and which surfactants are present in an amount of from about 0.01 to about 7 weight percent based on the total ink components.

16. A process in accordance with claim 14 wherein said additives are penetrants of N-methylpyrrolidinone, sulfoxides, ketones, lactones, esters, alcohols, butyl carbitol, benzyl alcohol, cyclohexylpyrrolidinone, and 1,2-hexanediol, present in an amount of from about 0.01 percent to 20 percent by weight.

17. A process in accordance with claim 2 wherein the mixtures are comprised of from about two to four additives each present in amount ranging from about 1 percent to about 99 weight percent, and wherein the total thereof is about 100 percent.

18. A process in accordance with claim 2 wherein the vehicle is a glycol, the colorant is a pigment, and which pigment is present in an amount of about 3 to about 15 weight percent.

19. A process in accordance with claim 2 wherein the perfluorosurfactant is a perfluorooctanoicacid ammonium salt, a perfluorooctanesulfonic acid alkali metal salt, a perfluoroheptoxy poly(propyloxy)acrylate, an ethylperfluorooctanesulfamido ethyl acrylate, 2-(N-butylperfluorooctanesulfamido) ethyl acrylate, a monofluorooctyl maleate, perfluorooctanoic acid alkali salt, or a perfluoropentanoic alkali salt.

20. A process which comprises (a) providing a acoustic ink printer having a pool of an ink comprised of a vehicle, a colorant, and a perfluorosurfactant, with a free surface, and a printhead including at least one droplet ejector for radiating the free surface of said ink with focused acoustic radiation to eject individual droplets of ink therefrom on demand, said radiation being brought to focus with a finite waist diameter in a focal plane, and which ink possesses a viscosity of from about 0.7 to about 5 centipoise at a temperature of from about 25 degree Centigrade to about 50 degree Centigrade, and (b) causing droplets of said ink to be ejected onto a recording sheet in an imagewise pattern at a temperature of from about 20 degree Centigrade to about 50 degree Centigrade.

21. A process in accordance with claim 20 wherein the ink further includes a sulfonated polyester.

22. A process in accordance with claim 20 wherein said perfluorosurfactant is perfluorooctanoic acid ammonium salt, perfluoroheptoxy poly(propyloxy)acrylate, or N-ethylperfluorooctanesulfamido ethyl acrylate.

* * * * *